US006940036B2

(12) United States Patent
Bayer et al.

(10) Patent No.: US 6,940,036 B2
(45) Date of Patent: Sep. 6, 2005

(54) LASER-PLASMA HYBRID WELDING METHOD

(75) Inventors: Erwin Bayer, Dachau (DE); Joerg Hoeschele, Meckenbeuren (DE); Juergen Steinwandel, Uhldingen-Muehlhofen (DE); Rainer Willneff, Markdorf (DE)

(73) Assignees: MTU Aero Engines GmbH, Munich (DE); DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/484,729

(22) PCT Filed: Apr. 25, 2002

(86) PCT No.: PCT/DE02/01510
§ 371 (c)(1),
(2), (4) Date: Sep. 16, 2004

(87) PCT Pub. No.: WO03/011516
PCT Pub. Date: Feb. 13, 2003

(65) Prior Publication Data
US 2005/0016970 A1 Jan. 27, 2005

(30) Foreign Application Priority Data
Jul. 28, 2001 (DE) .......................................... 101 36 951

(51) Int. Cl.[7] .................................................. B23K 9/00
(52) U.S. Cl. .............. 219/121.46; 219/680; 219/121.64
(58) Field of Search ........................ 219/121.11, 121.36, 219/121.45, 121.46, 121.48, 121.5, 121.55, 121.6, 121.63, 121.64, 678–680, 690

(56) References Cited

U.S. PATENT DOCUMENTS

| 4,689,467 | A | | 8/1987 | Inoue |
| 6,034,434 | A | | 3/2000 | Bothra et al. |
| 6,469,277 | B1 | * | 10/2002 | Trube et al. ............ 219/121.63 |
| 6,603,092 | B2 | * | 8/2003 | Briand et al. .......... 219/121.64 |
| 6,686,555 | B2 | * | 2/2004 | Bayer et al. ........... 219/121.46 |

FOREIGN PATENT DOCUMENTS

| DE | 3915477 A1 | 11/1989 |
| DE | 19500512 A1 | 4/1996 |
| EP | 0976488 A1 | 2/2000 |

OTHER PUBLICATIONS

Copy of previously submitted German Office Action dated Mar. 21, 2002 with English translation.

* cited by examiner

Primary Examiner—Tu Hoang
(74) Attorney, Agent, or Firm—Crowell & Moring LLP

(57) ABSTRACT

In a process for laser-plasma hybrid welding, to weld work pieces, a laser beam and a plasma jet are brought together in the process region close to the work piece. A free microwave-induced plasma jet is generated by the following process. Microwaves are generated in a high-frequency microwave source, and the microwaves are guided in a hollow waveguide. A process gas is introduced into a microwave-transparent tube, which includes a gas inlet opening and a gas outlet opening, at a pressure $p \geq 1$ bar. The process gas is introduced into the microwave-transparent tube through the gas inlet opening in such a manner that it has a tangential flow component. A plasma is generated in the microwave-transparent tube by electrode-free ignition of the process gas, and a plasma jet is generated by introduction of the plasma into the working space through a metallic nozzle arranged at the gas outlet opening of the tube.

18 Claims, 2 Drawing Sheets

LASER-PLASMA HYBRID WELDING METHOD

BACKGROUND AND SUMMARY OF THE INVENTION

The invention relates to a process for laser-plasma hybrid welding.

U.S. Pat. No. 6,034,343 describes a fixture in which a laser welding process and a conventional plasma welding process, for example tungsten inert gas welding (TIG) or metal active gas welding (MAG), are combined with one another. In this case, an arc burns between a non-melting electrode, usually a tungsten electrode, and the work piece, with the work piece being partially melted. The laser beam is focused onto the work piece by means of a lens system. The lens system and the electrode are arranged concentrically with respect to one another. The laser beam can then be used to concentrate a high energy output in a narrow and deep area of the partially melted work piece.

A further process for the welding of work pieces by means of laser-plasma hybrid welding is described in German publication DE 195 00 512 A1. In this case, the laser beam used to weld the work pieces and the arc are arranged at an angle to one another. In this known process too, the arc burns between an electrode and the work piece.

The known processes have proven to have the drawback that the welding speed is relatively low on account of the current intensity being limited by the service life of the electrode, leading to a limited arc power. Moreover, on account of the relatively high thermal conductivity of the work pieces which are to be welded, a considerable proportion of the heat which is introduced into the work piece flows away into the environment of the weld seam. This results in further drawbacks with regard to a high thermal load on the work piece, leading to considerable distortion of the work piece.

A further drawback is the restricted use of process gases. For example, it is customary for noble gases to be used as process gas in the known processes. The use of oxygen, for example, and other process gases which are corrosive with respect to the electrode materials is not possible.

On account of the high arc divergence of the plasma jet and the associated low power density introduced into the work piece, a high-power laser is required for the known laser-plasma hybrid welding processes.

Further drawbacks include the low long-term stability and also the cost-intensive structure and operation of conventional laser-plasma hybrid welding systems.

It is an object of the invention to provide a process for laser-plasma hybrid welding in which the investment and operating costs of the laser-plasma hybrid welding process can be reduced and the welding speed can be increased.

This object is achieved by the claimed invention. Advantageous embodiments of the invention form the subject matter of subclaims.

According to the invention, a free microwave-induced plasma jet is used for the laser-plasma hybrid welding, and this jet is generated in the following way: microwaves which are guided in a hollow waveguide are generated in a high-frequency microwave source. The process gas is introduced into a microwave-transparent tube, which comprises a gas inlet opening and a gas outlet opening, at a pressure $p \geq 1$ bar, through the gas inlet opening of the tube, in such a manner that it has a tangential flow component. A plasma is generated in the microwave-transparent tube by means of electrode-free ignition of the process gas, and this plasma is then introduced into the working space through a metallic nozzle arranged at the gas outlet opening of the tube, with the result that the plasma jet is generated. The work piece to be welded is in particular located in the working space.

The laser beam is advantageously generated in a solid-state laser, in particular an Nd-YAG laser, or in a gas laser, in particular a $CO_2$ laser or excimer laser. However, it is also possible for the laser beam to be generated in a diode laser.

In a first advantageous embodiment of the invention, the laser beam runs through the microwave-transparent tube and through the opening of the nozzle into the working space. In this case it is possible; for example, for the laser beam and the plasma jet to run concentrically with respect to one another. Given a correspondingly large opening diameter of the nozzle, however, it is also possible for the laser beam and the plasma jet to run at a predeterminable angle, which is limited by the geometry of the arrangement, with respect to one another. The advantage of this embodiment is that the laser beam plays a supporting role in the ignition and maintenance of the plasma. Moreover, this makes it possible to realize a compact structure of a laser-plasma hybrid welding process.

In a second advantageous embodiment of the laser-plasma hybrid welding process according to the invention, the laser beam runs outside the microwave-transparent tube. In this case, it is possible, in a suitable arrangement, for the laser for generating the laser beam outside the hollow waveguide arrangement for generation of the plasma jet to be positioned in such a manner that the laser beam and the plasma jet cross one another on the surface or in the region close to the surface of the work piece which is to be welded. Furthermore, the laser beam and the plasma jet may also be arranged in such a manner with respect to one another that the laser beam precedes the plasma jet in the welding process, or vice versa. This allows the quality of the weld seam to be improved and the welding speed to be increased.

Particularly advantageous plasma properties result by means of the electrode-free laser-plasma hybrid welding process according to the invention. For example, the specific enthalpy of the plasma and the associated enthalpy flow density of the plasma are increased. In view of this effect, the plasma temperature of the plasma and of the plasma jet is increased. This provides advantages in terms of an increased welding speed and lower weld seam costs compared to the laser-plasma hybrid welding process disclosed in the prior art. The laser-plasma hybrid welding process according to the invention therefore provides an electrode-free laser-plasma hybrid welding process which offers considerable advantages in terms of operating economics and applications combined, at the same time, with a wide range of uses for the welding process.

Moreover, the properties of the plasma jet with regard to a reduced diameter and a reduced jet angle divergence are improved. Furthermore, the cylinder-symmetrical plasma jet opens out in parallel in the process according to the invention.

The tangential feeding of the process gas into the microwave-transparent tube causes an axial flow component directed toward the gas outlet opening of the tube to form in the tube. This assists with the generation in accordance with the invention of a plasma jet with a low beam angle divergence. On account of the radial acceleration which is caused by the process gas being fed in tangentially and is further boosted by the narrowing of the cross section of the nozzle in the direction of the nozzle outlet, the nonuniformly accelerated free charge carriers move toward the nozzle outlet on ever narrower spiral paths, with the result that the centripetal acceleration of the charge carriers increases. This movement is maintained by the charge carriers even after they have emerged from the nozzle into the working space. Since there is no local charge neutrality on account of the different ion and electron mobility, an axially oriented magnetic field, which leads to a flow constriction of the plasma jet after it emerges from the nozzle (z pinch), is induced in the plasma jet. This is because of the magnetohydrodynamic effect (MHD effect).

A further advantage of the process according to the invention is that the plasma jet can be generated by means of inexpensive and robust high-frequency systems, e.g. a magnetron or klystron. These high-frequency systems advantageously make microwave sources in the required power range up to 100 kW and frequency range from 0.95 GHz to 35 GHz available. In particular, it is possible to use microwaves with a frequency of 2.46 GHz, since this involves inexpensive microwave sources which are in widespread use in industry and domestic applications.

On account of the electrode-free generation of plasma, there is no restriction in the process according to the invention in terms of the process gases which can be used. Therefore, the process according to the invention solves the problem of the prior art whereby in the case of electron-induced plasmas reactions occur between the process gases used and the electrode materials, for example leading to the formation of tungsten oxide or tungsten nitride in the case of tungsten electrodes or leading to hydrogen embrittlement. It is therefore possible for the specific enthalpy of the plasma to be increased, in combination with an improved heat conduction between plasma and work piece, by suitable selection of gases or gas mixtures which are appropriate to the process.

Moreover, on account of the electrode-free laser-plasma hybrid welding, the introduction of undesired electrode material into the weld metal is avoided. Furthermore, a disruption-free, unmanned and automated welding process is possible without worn parts having to be constantly replaced.

A further advantage of the laser-plasma hybrid welding process according to the invention is that the heat-affected zone of the plasma jet on the work piece is significantly reduced, which leads to a lower introduction of heat, a reduced work piece distortion and a drop in the levels of damage to the material. Moreover, the laser-plasma hybrid welding process according to the invention allows defect-free welding in terms of reduced weld undercuts and a low porosity in the weld seam.

To ensure reliable operation and reliable ignition of the plasmas required for the process according to the invention, in an advantageous embodiment of the invention the cross section of the hollow waveguide which is provided for guiding the microwaves is narrowed. In this case, the hollow waveguide is preferably narrowed at the location at which the microwave-transparent tube is guided through the hollow waveguide. The hollow waveguide and the tube are oriented perpendicular to one another in an expedient embodiment of the invention. The advantage of this is an increase in the electrical field strength at the location of the narrowed cross section. This firstly improves the ignition properties of the process gas and secondly increases the power density of the plasma.

In a further advantageous embodiment of the invention, it is also possible for a spark gap to be used to ignite the plasma.

BRIEF DESCRIPTION OF THE DRAWINGS

The invention and further advantageous embodiments of the invention are explained in more detail below with reference to the drawings.

DETAILED DESCRIPTION OF THE INVENTION

Figure 1:
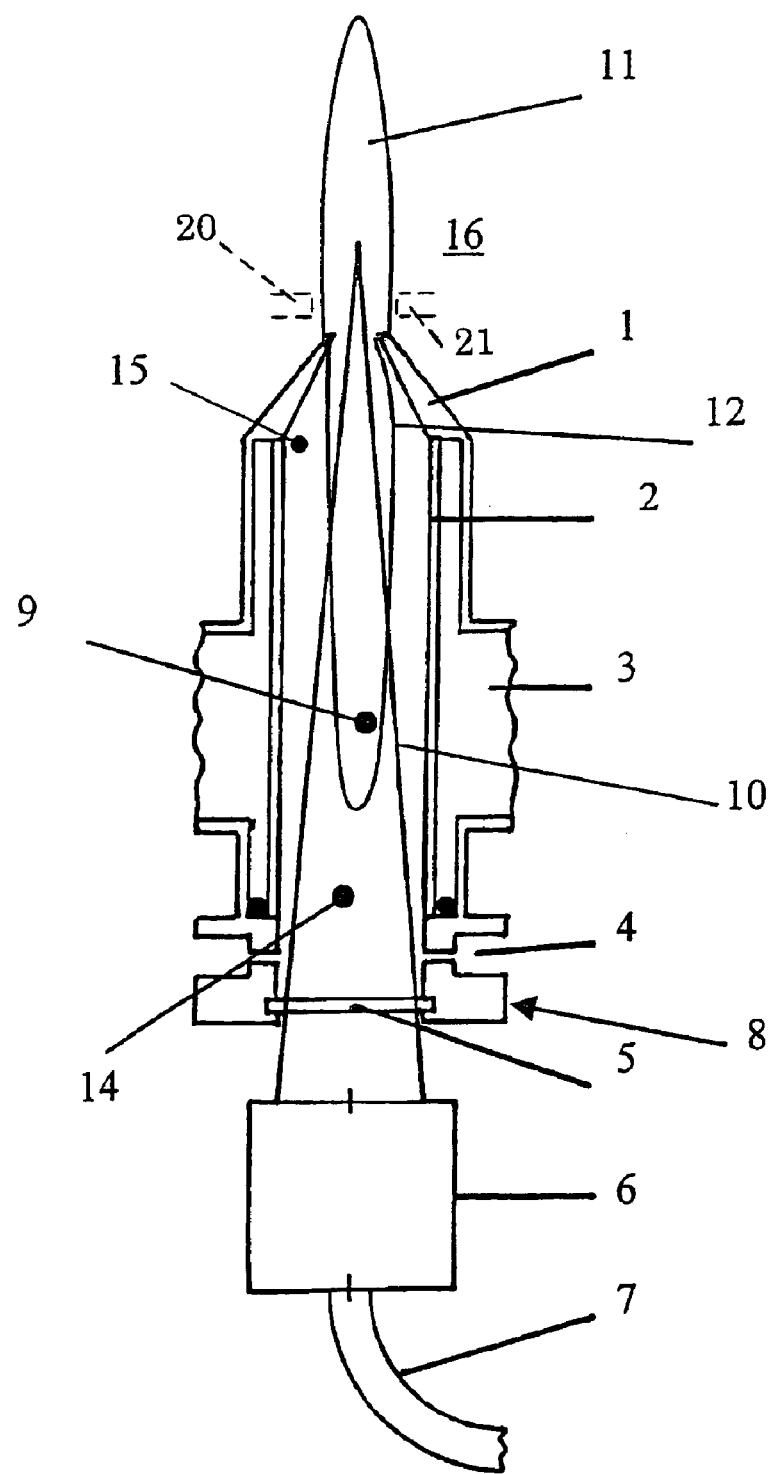
FIG. 1 shows a sectional illustration of a first embodiment for carrying out the process according to the invention, in which the laser beam runs through the microwave-transparent tube.

FIG. 1 shows a sectional illustration of a first embodiment for carrying out the process according to the invention. In this embodiment, the laser beam 10 runs through the microwave-transparent tube 2. The illustration shows a microwave-transparent tube 2 which is guided perpendicularly through a hollow waveguide 3 which transports the microwaves generated by a microwave source (not shown). In this case, commercially available waveguides can be used as hollow waveguide 3. However, it is also possible to use hollow waveguides which have a narrowing in the cross section in the region in which the microwave-transparent tube 2 runs through the hollow waveguide 3.

The microwave-transparent tube 2 has a gas inlet opening 14 for the process gas and a gas outlet opening 15 for the plasma 12. The plasma 12 is generated by microwave absorption in the region 9 in which the microwave-transparent tube 2 runs through the hollow waveguide 3.

At the gas inlet opening 14, the microwave-transparent tube 2 is connected to a gas feed unit 8, and at the gas outlet opening 15 the microwave-transparent tube 2 is connected to a metallic nozzle 1, through which the plasma 12 flows into the working space 16 as plasma jet 11. The metallic nozzle 1 may advantageously also be designed as an expansion nozzle. This results in further advantages relating to a low jet divergence in the plasma jet 11.

In the gas feed unit 8 there is a gas admission 4, through which the process gas is fed into the microwave-transparent tube 2. It is fed in in such a manner that the process gas flowing in has a tangential flow component and also an axial flow component oriented in the direction of the gas outlet opening 14. In particular, the process gas is guided on spiral paths (not shown) inside the microwave-transparent tube 2. This results in considerable centripetal acceleration of the gas in the direction of the inner surface of the microwave-transparent tube 2 and in the formation of a partial vacuum on the tube axis. This partial vacuum also facilitates the ignition of the plasma 12.

The laser beam 10 is generated in a laser source (not shown) and fed to optics 6 by means of an optical fiber 7. The optics 6 are arranged in front of a window 5 formed in the base of the gas feed unit 8 and introduce the laser beam 10 into the microwave-transparent tube 2. In the tube 2, the laser beam 10 runs parallel to the plasma 12 and emerges into the working space 16 through the nozzle 1 together with the plasma jet 11.

The plasma 12 can be ignited by means of a spark gap, e.g. between elements 20, 21 shown schematically in phantom in FIG. 1, e.g. an arc discharge or an ignition spark. If the hollow waveguide system is optimally set up, i.e with the maximum field strength of the microwave at the location of the tube axis, spontaneous plasma ignition is also possible.

Figure 2:
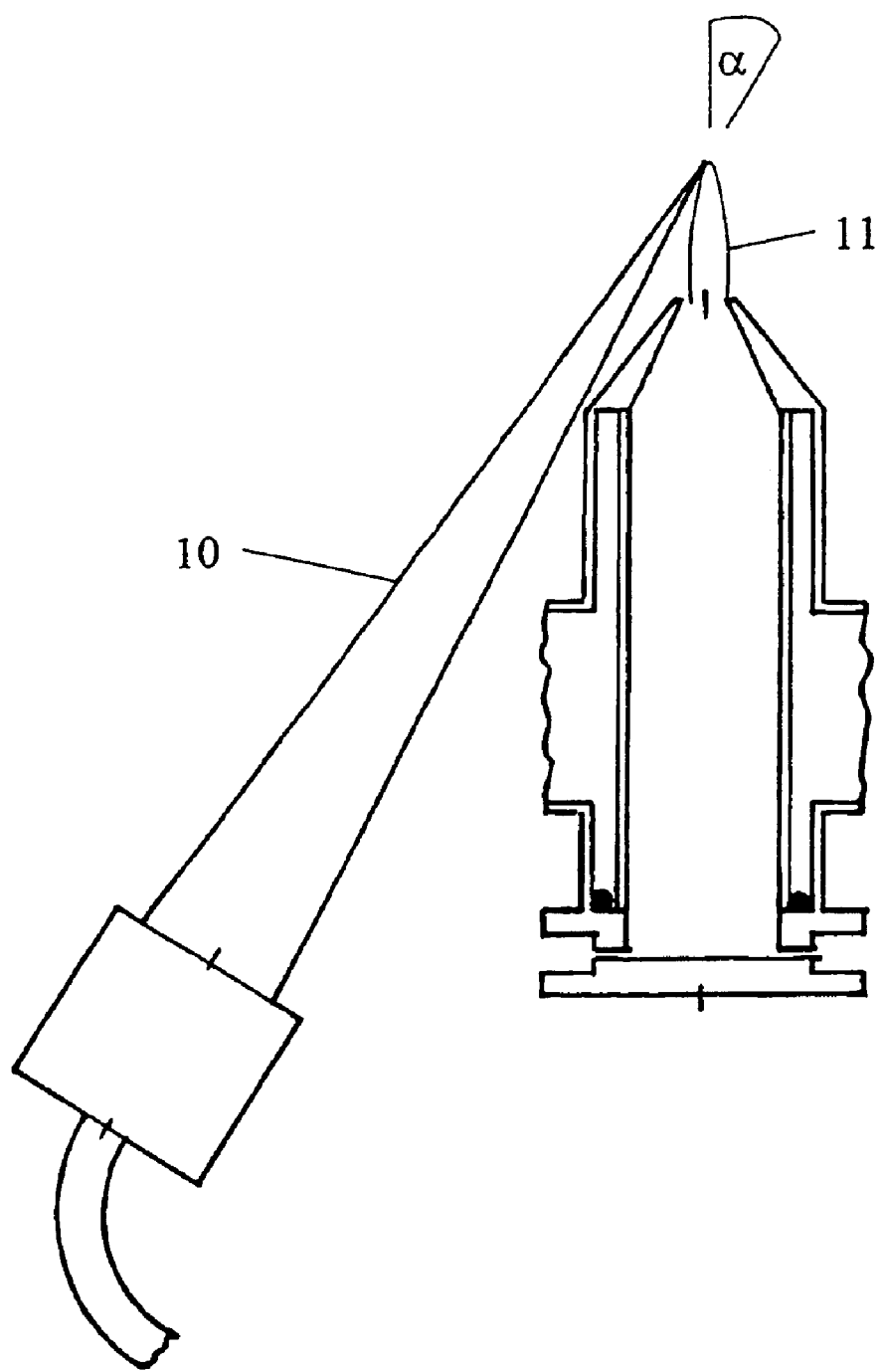
FIG. 2 shows a sectional illustration of a second embodiment for carrying out the process according to the invention, in which the laser beam runs outside the microwave-transparent tube.

FIG. 2 shows a sectional illustration of a second embodiment for carrying out the process according to the invention. In this embodiment, the laser beam 10 runs outside the microwave-transparent tube 2. The laser beam 10 and the plasma jet 11 are in this case arranged at an angle to one another which is such that they are brought together downstream of the nozzle 1, as seen in the direction of propagation of the plasma jet. The plasma jet 11 and the laser beam 10 are generated as described in FIG. 1.

We claim:

1. A process for laser-plasma hybrid welding, in which, to weld a workpiece, a laser beam and a plasma jet are brought together in a process region close to the workpiece, the plasma jet being a free microwave-induced plasma jet generated by:
   generating microwaves in a high-frequency microwave source,
   guiding the microwaves in a hollow waveguide,
   introducing a process gas into a microwave-transparent tube, which comprises a gas inlet opening and a gas outlet opening, at a pressure $p \geq 1$ bar, the process gas being introduced into the microwave-transparent tube through the gas inlet opening in such a manner that it has a tangential flow component,
   generating a plasma in the microwave-transparent tube by microwave absorption,
   generating a plasma jet by introduction of the plasma into a working space through a metallic nozzle arranged at the gas outlet opening of the tube, and
   welding a workpiece in the working space with the laser beam and the plasma jet.

2. The process as claimed in claim 1, wherein the laser beam is generated in a Nd-YAG solid state laser, a $CO_2$ laser, an excimer laser, or a diode laser.

3. The process as claimed in claim 1, wherein the laser beam is guided through the microwave-transparent tube and through the metallic nozzle.

4. The process as claimed in claim 3, wherein the metallic nozzle is an expansion nozzle.

5. The process as claimed in claim 1, wherein the laser beam is guided outside the microwave-transparent tube.

6. The process as claimed in claim 3, wherein the laser beam and the plasma jet are at an angle to one another.

7. The process as claimed in claim 1, wherein microwaves in the frequency range between 0.95 GHz and 35 GHz are used to generate the plasma.

8. The process as claimed in claim 1, wherein the hollow waveguide, which is oriented perpendicular to the microwave-transparent tube, has a narrowed cross section at the location at which the tube is guided through the hollow waveguide.

9. The process as claimed in claim 1, wherein the microwave-transparent tube used is a tube with dielectric properties made from $SiO_2$ or $Al_2 O_3$ in pure form without any doping.

10. The process as claimed in claim 1, wherein a spark gap is used to ignite the plasma.

11. The process as claimed in claim 2, wherein the laser beam is guided through the microwave-transparent tube and through the metallic nozzle.

12. The process as claimed in claim 11, wherein the metallic nozzle is an expansion nozzle.

13. The process as claimed in claim 2, wherein the laser beam is guided outside the microwave-transparent tube.

14. The process as claimed in claim 5, wherein the laser beam and the plasma jet are at an angle to one another.

15. The process as claimed in claim 2, wherein microwaves in the frequency range between 0.95 GHz and 35 GHz are used to generate the plasma.

16. The process as claimed in claim 2, wherein the hollow waveguide, which is oriented perpendicular to the microwave-transparent tube, has a narrowed cross section at the location at which the tube is guided through the hollow waveguide.

17. The process as claimed in claim 2, wherein the microwave-transparent tube used is a tube with dielectric properties made from $SiO_2$ or $Al_2 O_3$ in pure form without any doping.

18. The process as claimed in claim 2, wherein a spark gap is used to ignite the plasma.

* * * * *